United States Patent
Kaestle

(10) Patent No.: US 10,268,922 B2
(45) Date of Patent: Apr. 23, 2019

(54) IMAGE PROCESSING BY MEANS OF CROSS-CORRELATION

(71) Applicant: OSRAM GmbH, Munich (DE)

(72) Inventor: Herbert Kaestle, Traunstein (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 15/532,111

(22) PCT Filed: Nov. 18, 2015

(86) PCT No.: PCT/EP2015/076918
§ 371 (c)(1),
(2) Date: Jun. 1, 2017

(87) PCT Pub. No.: WO2016/087202
PCT Pub. Date: Jun. 9, 2016

(65) Prior Publication Data
US 2017/0270385 A1    Sep. 21, 2017

(30) Foreign Application Priority Data
Dec. 1, 2014 (DE) .................. 10 2014 224 557

(51) Int. Cl.
*G06K 9/62* (2006.01)

(52) U.S. Cl.
CPC ......... *G06K 9/6202* (2013.01); *G06K 9/6215* (2013.01)

(58) Field of Classification Search
CPC .......................... G06K 9/6202; G06K 9/6215
See application file for complete search history.

(56) References Cited

U.S. PATENT DOCUMENTS 6,865,288 B1 * 3/2005 Shishido ............... G06T 7/001
382/141
2008/0199056 A1 * 8/2008 Tokuse ............... G06K 9/00295
382/118
(Continued)

FOREIGN PATENT DOCUMENTS

EP    1381005 A1    1/2004
WO    2007028799 A1    3/2007

OTHER PUBLICATIONS

Ran et al, "Reliable segmentation of pedestrians in moving scenes", IEEE International conference on acoustics, speech, and signal processing, Mar. 2005, p. 229-232, Philadelphia, PA, USA.
(Continued)

*Primary Examiner* — Ming Y Hon
(74) *Attorney, Agent, or Firm* — Viering Jentschura & Partner MBB

(57) ABSTRACT

A method for image processing is disclosed. A non-normalized cross correlation is used to produce a cross correlation matrix between a recorded image, which contains at least one captured object, and a reference image, which contains a reference object. A comparison between a plurality of regions of the correlation matrix is carried out for a respectively captured object. A decision as to whether the respectively captured object and the reference object correspond is made on the basis of a result of the comparison. The non-normalized cross correlation is carried out by means of the equation $$CC_{ri,rj} = \sum_{x=0}^{NTx} \sum_{y=0}^{NTy} T_{x,y} \cdot Img_{(x-ri),(y-rj)}.$$

$CC_{ri,rj}$ denotes a point or a matrix element of a cross correlation matrix or of a "correlogram" CC, $Img_{i,j}$ denotes a pixel (i, j) of a recorded matrix-shaped image Img and $T_{k,l}$ denotes a pixel (k,l) of a matrix-shaped reference image or reference template T with (NTx·NTY) pixels, which contains a reference object.

16 Claims, 2 Drawing Sheets

(56) References Cited

U.S. PATENT DOCUMENTS

| | | | | |
|---|---|---|---|---|
| 2015/0339862 A1* | 11/2015 | Skaaksrud | ............... | G06K 9/00 |
| | | | | 382/101 |
| 2015/0356743 A1* | 12/2015 | Kintou | ...................... | G06T 3/40 |
| | | | | 382/103 |
| 2016/0042514 A1* | 2/2016 | Amat Roldan | ....... | G06T 7/0016 |
| | | | | 382/131 |
| 2016/0133023 A1* | 5/2016 | Kaestle | ................ | G06K 9/2027 |
| | | | | 382/218 |

OTHER PUBLICATIONS

Lee et al, "Application of multi-bit correlators for a real-time pattern recognition system", Aug. 11, 1992, p. 504-509, Dept. of Electronic Engineering, Hong Kong Polytechnic, Hung Hom, Hong Kong.
International Search Report based on application No. PCT/EP2015/076918 (14 pages and 3 pages of English translation) dated Feb. 18, 2016 (Reference Purpose Only).
Ballard et al,"Computer Vision", Prentice Hall, Inc, 1982, pp. 65-57.
German Search Report based on application No. 10 2014 224 557.5 (8 pages) dated Sep. 15, 2015 (for reference purpose only).

* cited by examiner

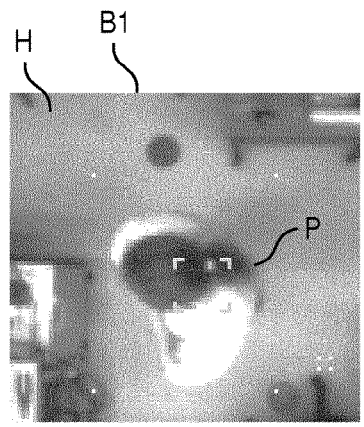
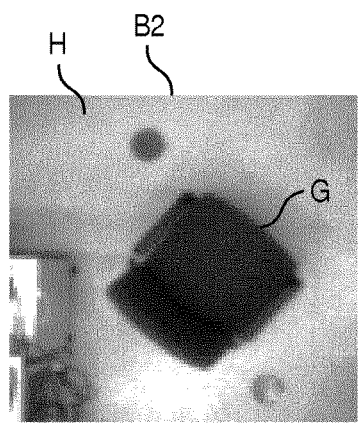
Fig.2　　　　　　　　　　　Fig.4
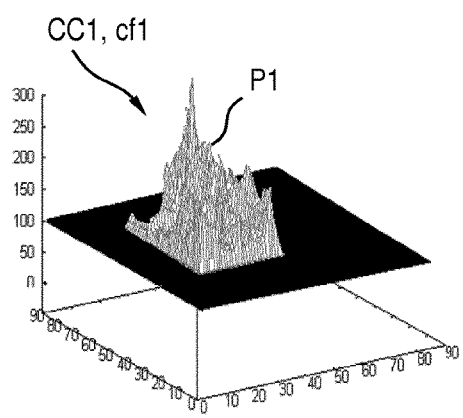
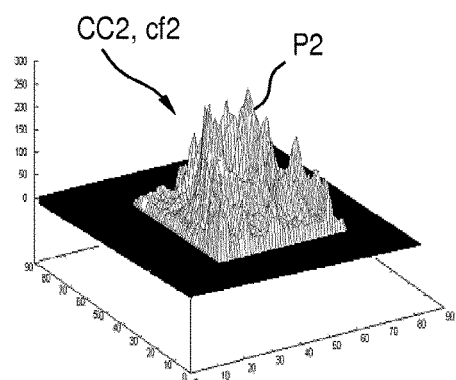
Fig.3　　　　　　　　　　　Fig.5

IMAGE PROCESSING BY MEANS OF CROSS-CORRELATION

RELATED APPLICATIONS

The present application is a national stage entry according to 35 U.S.C. § 371 of PCT application No.: PCT/EP2015/076918 filed on Nov. 18, 2015, which claims priority from German application No.: 10 2014 224 557.5 filed on Dec. 1, 2014, and is incorporated herein by reference in its entirety.

TECHNICAL FIELD

The present disclosure relates to a method for image processing, wherein a cross correlation matrix of a recorded image, which contains a captured object, and of a reference image, which contains a reference object, is produced. By way of example, the present disclosure is applicable as a presence detector and to lighting systems including at least such a presence detector, in particular for room lighting and exterior lighting, in particular for monitoring and controlling the latter.

BACKGROUND

Passive IR sensitive ("PIR") detectors for recognizing a presence are known, said detectors usually reacting in a differential manner to object movements in their field of view by way of a simple signal capture. Here, conventional PIR detectors usually use PIR sensors on the basis of pyroelectric effects, which only react to changing IR radiation. That is to say, a constant background radiation remains unconsidered. Such PIR sensors can only be used as motion detectors—in cooperation with Fresnel zone optics from a technical point of view—and cannot be used to detect a static presence. However, this is not sufficient for advanced object recognition and/or object classification, so-called because it at least also relates to static object recognition and/or object classification. A further disadvantage of the PIR detectors consists in the fact that these have a relatively large installation volume on account of their IR-capable Fresnel optics. Moreover, a relatively high false positive detection rate emerges on account of the typically low angular resolution and range. If the motion detector is activated within the scope of a lighting system, a person must render themselves noticeable by way of clear gestures on account of the pure movement sensitivity to ensure the lighting system is or remains activated.

A further group of known motion detectors includes active motion detectors which emit microwaves in the sub-GHz range or else ultrasonic waves in order to search for Doppler shifts of moving objects in their echoes. Such active motion detectors are typically also only used as motion detectors and not for the detection of a static presence.

Further, a camera-based presence recognition using a CMOS sensor is known. The CMOS sensor records images in the typically visible spectral range or captures corresponding image data. The CMOS sensor is usually coupled to a data processing device which processes the recorded images or image data in respect of a presence and classification of present objects.

For the purposes of an object recognition with CMOS sensors, it is known initially to release at least one object in the image or the image data from a general background, or subject said object to free-form selection, and subsequently analyze the object by means of a feature-based object recognition or pattern recognition and classify said object in respect of its properties and hence recognize it. For the presence recognition and general lighting fields of application, objects which are similar to a person or a human contour are mainly of interest, in order, for example, to emit a corresponding status signal to a light management system in the case of a positive result.

However, a direct arithmetic comparison between the captured object and the reference object cannot be used as the similarity measure within the scope of the image processing since, to this end, the two comparison images would have to have the same image values such as exposure, contrast, position, and perspective; in practice, this is not the case. Therefore, the normalized cross correlation analysis (also referred to as NCC) is often used in practice, in which an object which was subjected to free-form selection from the background and then captured or "segmented" is compared with a suitable reference image by way of statistical 2D cross correlation analyses and the result of the comparison is used as a characteristic similarity measure for making a decision about a presence of a person. The normalized cross correlation analysis to this end evaluates absolute differences between the captured object and the reference image using statistical methods, while absolute sums between the original image and the reference image may also still be evaluated using a convolution analysis in a complementary manner.

Since the normalized cross correlation analysis requires much computational and memory outlay, it is only suitable to a restricted extent for implementation in a microcontroller or DSP-based sensor system, which typically has restricted computational power and memory capacity.

SUMMARY

It is the object of the present disclosure to at least partly overcome the disadvantages of the prior art and, in particular, provide an improved option for classifying objects, in particular persons, which were observed by a camera. In particular, it is an object of the present disclosure to provide a simpler option, from the computational point of view, for such a classification of objects.

This object is achieved in accordance with the features of the independent claims. Preferred embodiments may be gathered, in particular, from the dependent claims.

The object is achieved by a method for image processing, wherein (a) a non-normalized cross correlation or cross correlation calculation is used to produce a correlation matrix between a recorded image, which contains at least one captured object, and a reference image, which contains a reference object; (b) a comparison between a plurality of regions of the correlation matrix is carried out; and (c) a decision as to whether the captured object and the reference object correspond is made on the basis of a result of the comparison.

The method is advantageous in that it offers effective object recognition with substantially less memory and computational outlay when compared to the normalized cross correlation analysis as a result of using the mathematically simple non-normalized cross correlation.

A recorded image may be understood to mean an original image recorded by means of a camera or an image which was derived or further processed therefrom. An image derived by image processing may be e.g. an image, in which an image background has been removed, which has been tailored to the object, in which a brightness resolution has been changed, in which the object has been rotated, etc.

In particular, the recorded original image is an image recorded in the visible spectrum, as a result of which a high resolution in comparison with an infrared image recording emerges, significantly simplifying an object recognition. Typically, the original image has (m·n) pixels arranged in the form of a matrix. However, an infrared image may be recorded as an alternative or in addition thereto. In principle, IR detectors with a high image resolution, for example on the basis of GaAs sensors or microbolometer-based sensors, are available but still very expensive. Currently, they are mainly used in e.g. FLIR ("forward-looking infrared") cameras or in a thermal building inspection.

In particular, a captured object is understood to mean an object not belonging to an image background. A captured object may be provided by virtue of the image background being determined and removed from the image in the original image. Additionally, or as an alternative thereto, an object not belonging to the image background may be captured against the image background. An object which was captured and subjected to free-form selection or an exposed object may also be referred to as "segmented" object. Determining the image background may include a comparison with an image background recorded previously without the presence of an object as a (background) reference. By way of example, when capturing the object, any pixel group which differs or is set apart from a predetermined background may initially be treated as an unidentified object. Then, an attempt is made to identify each of these captured objects by means of the classification.

This is advatangeously carried out in such a way that, if a plurality of segmented or segmentable objects are present, each of the segmented objects is provided individually—for example several objects in succession—for the classification or an attempt is made to identify each of the segmented objects individually by means of the classification. Consequently, in a configuration, a comparison between a plurality of regions of the correlation matrix is carried out in step (b) for a respectively captured object. Then, in a further configuration, a decision as to whether the respectively captured object and the reference object correspond is made on the basis of a result of the comparison.

In a further configuration, each of the captured objects is individually subjected to free-form selection and/or segmentation if a plurality of objects are present or a plurality of objects are captured.

Then, no mutual interferences of the plurality of objects are present when assessing the peaks in the correlogram (see below, e.g. the evaluation by means of an autocorrelation peak).

Thus, the method makes use of the circumstances that the non-normalized cross correlation analysis offers an alternative to the normalized cross correlation analysis for carrying out an effective object recognition with a significantly reduced computational outlay.

In a particularly computationally efficient embodiment, the non-normalized cross correlation analysis may be represented in accordance with the following equation (1), or the non-normalized cross correlation may be carried out in accordance with the following equation (1):

$$CC_{ri,rj} = \sum_{x=0}^{NTx} \sum_{y=0}^{NTy} T_{x,y} \cdot Img_{(x-ri),(y-rj)},$$

where $CC_{ri,rj}$ denotes a point or a matrix element of a cross correlation matrix or of a "correlogram" CC.

$Img_{i,j}$ denotes a pixel (i, j) of a recorded matrix-shaped image Img.

$T_{k,l}$ denotes a pixel (k,l) of a matrix-shaped reference image or reference template T with (NTx·NTY) pixels, which contains a reference object. The number of pixels (i.e. the image size) of the recorded image Img and of the reference image T may be the same or different. The summation operations only need to be carried out over the size range k=0, . . . , NTx and 0, . . . , NTy of the reference image T. The size of the recorded image Img or $\{Img_{i,j}\}$ may correspond to the size of the original image recorded by a camera or it may represent a section thereof.

A factor for the success in the case of the successful application of the non-normalized cross correlation analysis is that an object size of the captured object or the scaling of an object does not have too large deviations from the size of the reference object.

What is exploited in this respect in step (b) is that, in the case of a size comparison, objects with different sizes (but e.g. the same brightness and alignment) manifest themselves in different signatures of the characteristic peaks in the cross correlation matrix CC.

Thus, the cross correlation matrix CC of two identical images has a pronounced, practically singular peak or "autocorrelation peak". The height and width of this ideal autocorrelation peak depends on the overall size and the structure complexity of the reference image and may therefore be used as a fixed system variable. The more the recorded image Img and the reference image T differ, the flatter the correlation peak becomes as well since the result values of the matrix elements $CC_{ri,rj}$ are distributed more strongly over the correlogram CC than in the case of the ideal autocorrelation peak.

In particular, under the condition that the segmented objects are successively used individually for the examination or are subjected individually to the method and hence subjected individually to step (b) and step (c), the comparison between a plurality of (matrix) regions of the correlation matrix CC may yield a similarity measure or a correspondence measure between the recorded object image Img and the reference image T as a result of the "sharpness" or "dominance" of the correlation peak.

Thus, in one development, the correlation analysis or the method, in particular step (a), is carried out in each case with only one object which is captured in the recorded image or segmented from the recorded image. If a plurality of segmented or segmentable objects are present in the image, the correlation analysis may, in particular, be carried out in succession for the plurality of segmented objects.

Consequently, a decision as to whether the captured object and the reference object correspond may be made in step (c) on the basis of the result of the comparison.

Thus, step (b) renders it possible to take into account possible different object sizes with computationally simpler methods, without this requiring a rescaling of the captured object prior to the calculation of the correlogram CC in a complicated manner and with loss of information.

In one configuration, a comparison or subdivision of an inner region and an outer region of the cross correlation matrix or of the correlogram CC is carried out in step (b). This configuration can be implemented particularly easily. By way of example, the first, "inner" (matrix) region may be a region including the autocorrelation peak, which adjoins a second, "outer" (matrix) region, in particular is surrounded by the outer region or edge region.

By way of example, the inner region may be an e.g. circular or rectangular region of the correlogram CC, which is centered on the autocorrelation peak. The inner region may be centered on the center of the correlogram CC (in the case of a matrix-like representation). By way of example, the inner region and the outer region may at least approximately have the same number of matrix elements.

Alternatively, a count value c_mid for the inner region may be determined in such a way that the entire correlogram CC is weighted by a weighting function, the weighting factor of which decreases from the inside to the outside. Here, in particular, matrix elements are weighted more strongly the closer they are situated to a predetermined center (e.g. the center of gravity or the autocorrelation peak) of the correlogram CC. By way of example, use may be made of a quadratic or Gaussian weighting function, which is centered on the center. The (summed) count value c_mid for the inner region may then, for example, be determined as a sum over the weighted count values of all matrix elements of the correlogram. Here, the assumption is made that the count values for the outer region only contribute a negligible contribution as a result of the weighting.

A (summed) count value c_rim for the outer region may, for example, be calculated from the sum of all non-weighted count values of all matrix elements of the correlogram. A further option for calculating the count value c_rim for the outer region includes the summation of all matrix elements of the correlogram which were weighted in an inverted fashion in advance such that outer matrix elements are weighted more strongly than inner matrix elements. By way of example, this may be achieved by means of an inverted Gaussian distribution.

The use of a weighting function when calculating the (summed) count values c_mid and/or c_rim is advantageous in that the matrix elements need not be explicitly assigned to the inner region and the outer region in advance.

In general, a count value of a region of the correlogram may be understood to mean, in particular, a sum of the values of the matrix elements $CC_{ri,rj}$ of only this region or of the entire correlogram. Such a calculation may be carried out with very little outlay.

In particular, the outer region extends as far as the outer edge of the correlogram, which has the same size as the ROI region of the object image Img.

The ratio between the count values of the inner region of the correlogram CC and the count values of the outer region lies between 1 and the maximum value in the case of an ideal autocorrelation, depending on the similarity.

An object whose similarity only deviates slightly from the reference object (e.g. on account of a different shape and/or size) does not show a pronounced peak in the correlogram CC, but the distribution of the result values or matrix elements $CC_{ri,rj}$ does tend to concentrate in the inner region of the correlogram CC. Hence, the ratio between the count values of the inner region of the correlogram CC and the count values of the outer region only deviates slightly from the maximum value of the ideal autocorrelation peak.

An object whose similarity deviates more strongly from the reference object or which has little similarity (e.g. on account of a different shape and/or size) does not show a pronounced peak in the correlogram CC but instead shows a distribution of the side flanks thereof over the entire region of the correlogram CC. The ratio between the count values of the inner region of the correlogram CC and the count values of the outer region approaches 1 and is therefore low.

An object which differs from the reference object only as a consequence of its different size also no longer shows a pronounced peak in the center of the correlogram CC; nevertheless, the distribution of the matrix elements $CC_{ri,rj}$ between the inner region and the outer region of the correlogram CC shows characteristic features which can be exploited during the couting method by means of suitable scaling for the purposes of ascertaining a similarity measure.

The calculation of the count values of the inner region and of the outer region may—as also already described above—be implemented e.g. by means of at least one weighting function (e.g. a Gaussian weighting mask), which advantageously considers the values of the inner region and considers the values of the outer region to a correspondingly lesser extent. Here, the center of this Gaussian mask may be placed into the center of an object center. However, in principle, it is also possible to use a different weighting or even no weighting at all.

In another configuration, the comparison is carried out in step (b) on the basis of a ratio of count values c_mid from the inner region to count values c_rim from the outer region.

In a further configuration, the ratio of the (weighted or unweighted) count values c_mid and c_rim is linked to a size c_size of the captured object for the comparison. By way of example, the size c_size may correspond to the number of pixels belonging to the captured object. This is advantageous in that a size difference between the captured object and the reference object is also considered directly. This renders it possible to dispense with size scaling.

In one development, a characteristic similarity number cf is calculated as a result of the comparison, said similarity number rendering a decision as to whether the captured object and the reference object correspond to be particularly simple, e.g. by way of a comparison with at least one e.g. empirically determined threshold. By way of the empirically found threshold, a decision can be made as to whether the object to be classified has sufficient similarity with the reference object and the room is classified as having a person present or whether the object to be classified has too little similarity with the reference object and the room is classified as unoccupied.

In an even further configuration, a characteristic similarity number cf is calculated as a result of the comparison in step (b) as a measure of similarity in accordance with $$cf=(c\_mid^{n1}/c\_rim^{n2})c\_size^{n3}.$$

Here, n1, n2, and n3 are rational scaling components. By way of example, these can be used for weighting the individual components or count values c_mid, c_rim and/or c_size.

It was found to be particularly effective if the similarity number cf is calculated in accordance with the following equation (2):

$$cf=(c\_mid^2/c\_rim^3)c\_size^1,$$

i.e. with n1=2, n2=3, and n3=1. However, in general, the scaling components may assume any relationship with respect to one another, for example in accordance with n1>n2, n1=n2 or n1<n2.

In a further development, the similarity number cf is compared to at least one threshold cf_th, in particular an empirically determined threshold cf_th, e.g. a value of cf_th=50, for step (c).

Depending on whether the similarity number cf reaches, exceeds or drops below the threshold cf_th, a captured object may be classified as being in correspondence or without attunement with the reference and may thus be identified, e.g. as a human person.

In a further configuration, the recorded image from step (a) constitutes an image section which is tailored around the captured object. Thus, the recorded image from step (a) may have been provided by virtue of, for example, at least one object being captured in an original image recorded by a camera or in an image further processed therefrom and the underlying recorded image being tailored to the object. This may be implemented in such a way that there is a placement of a frame ("ROI frame") around an ROI ("region of interest") region completely containing the captured object to be classified and tailoring of the underlying recorded image to the ROI frame or to the ROI region. An advantage emerging from this configuration is that the recorded image which is to be examined effectively is reduced in size, reducing computational outlay. Moreover, the captured object is centered more strongly, further improving a subsequent object recognition by way of a classification.

In one development, before step (a), the original image recorded by the camera or the image cut therefrom is or has been freed from its background or subjected to free-form selection. This separation of the background further simplifies an object capture and subsequent object recognition by classification, particularly if the non-normalized cross correlation is applied as well.

In a further development, the captured object is rotated before step (a), in particular in such a way that a figure axis of the object lies parallel to a side edge of the image containing the captured object. This alignment also simplifies a subsequent object recognition through classification, in particular when applying the non-normalized cross correlation.

In a further configuration, an original image recorded by a camera—in particular in an image section tailored around the captured object—has been normalized in terms of brightness before step (a). What this achieves is that the original images and/or the object captured in the measured original images always have or has at least approximately the same brightness or intensity. Without this brightness normalization, objects such as bright spots or reflections, which have no similarity to a reference image, could bring about a high feed through in the application of the non-normalized cross correlation as a consequence of their intensity and thus, for example, lead to an incorrect recognition in the case of the presence detection.

In a particularly efficient configuration, the normalization in terms of brightness is carried out by the camera itself or automatically, in particular before the original image is recorded or stored. Alternatively, the original image may be processed further accordingly after being recorded, for example in the camera or in an independent data processing device.

In a further configuration, the normalization in terms of brightness is carried out on the basis of histogram values. In particular, to this end, recording parameters of the camera such as gain and exposure may be set by way of a control loop in such a way that the histogram values of the image are kept at least approximately constant at the same level, independently of the brightness conditions actually present in the scene. In the normalization in terms of brightness on the basis of histogram values, it is also possible only to use characteristic regions of the image instead of the entire image for measuring the brightness.

An advantageous development for a normalization—in particular for a camera-internal normalization—in terms of brightness on the basis of histogram values is that the brightest pixel (also referred to as "picture element"), a group of the brightest pixels or the pixels of the brightest image region are regulated to a constant brightness value. In this way, the brightness or intensity variations present in a scene may already be largely unified for the cross correlation analysis. However, all other suitable methods for normalizing the brightness may also be used.

The object is also achieved by a detector (referred to below as "presence detector" without loss of generality), wherein the presence detector includes at least one image sensor, in particular the CMOS sensor, and is embodied to carry out the method as described above. This presence detector may be embodied analogously to the method and results in the same advantages.

The at least one image sensor records the original images—which, in particular, are normalized in terms of brightness—and is coupled to a data processing device which processes these recorded original images within the scope of the above-described method, e.g. it carries out the non-normalized cross correlation, calculates the characteristic similarity number cf and carries out the threshold comparison. Thus, the method may run on the data processing device.

Alternatively, the data processing device may constitute a unit which is separate from the presence detector.

In particular, the presence detector is configured to trigger at least one action depending on a recognized object, e.g. output at least one signal, for example in order to switch on lighting and/or in order to notify a different entity (e.g. a security control room). By way of example, a signal for switching on lighting may be output after the object was recognized as a person. Such a signal may not be output if an animal has been identified. In addition, if a person has been identified in the vicinity of a door, the door may then be opened and lighting on the other side of the door may be switched on. Further, if the position of the identified object is known, a light source may be directed onto the object. Alternatively, or additionally, an alarm signal may be output to a monitoring unit, e.g. to a security control room.

By way of example, the presence detector may comprise a camera (e.g. a video unit) as image recording device and comprise the data processing device (e.g. a dedicated image data processing unit), wherein, depending on the results, the data processing unit switches a switch (e.g. a switching relay) or reports a result to a lighting system (for example a light management system).

The object is also achieved by a lighting system or a lighting device, which includes at least one presence detector as described above. Here, the presence detector, in particular the image sensor thereof, is coupled to at least one light source of the lighting system. The data processing device may constitute part of the lighting system, in which case the at least one presence detector, in particular the image sensor thereof, is coupled to the data processing device of the lighting system.

In particular, the lighting system may be equipped with a plurality of image sensors. This includes the case where the lighting system includes a plurality of cameras or video sensors. The plurality of cameras may be distributed among a plurality of presence detectors.

The cameras may comprise respective data processing devices. Alternatively, a data processing device of the lighting system may be coupled to a plurality of image sensors.

The lighting device may also be configured to trigger at least one action depending on an object recognized by at least one image sensor or presence detector, for example to output at least one signal, for example in order to switch on lighting and/or notify a different entity (e.g. a security control room).

BRIEF DESCRIPTION OF THE DRAWING(S)

The above-described properties, features and advantages of present disclosure, and the manner in which they are achieved, will become clearer and more easily understandable in conjunction with the following schematic description of an exemplary embodiment, which is explained in more detail in conjunction with the drawings. Here, for reasons of clarity, the same elements or elements with the same effect may be provided with the same reference.

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which:

FIG. 2 shows a first original image recorded by means of the method from FIG. 1;

FIG. 3 shows a correlogram, calculated by means of the method from FIG. 1 and depicted as a relief diagram, for the original image from FIG. 2;

FIG. 4 shows a second original image recorded by means of the method from FIG. 1; and FIG. 5 shows a correlogram, calculated by means of the method from FIG. 1 and depicted as a relief diagram, for the original image from FIG. 4.

DETAILED DESCRIPTION

Figure 1:
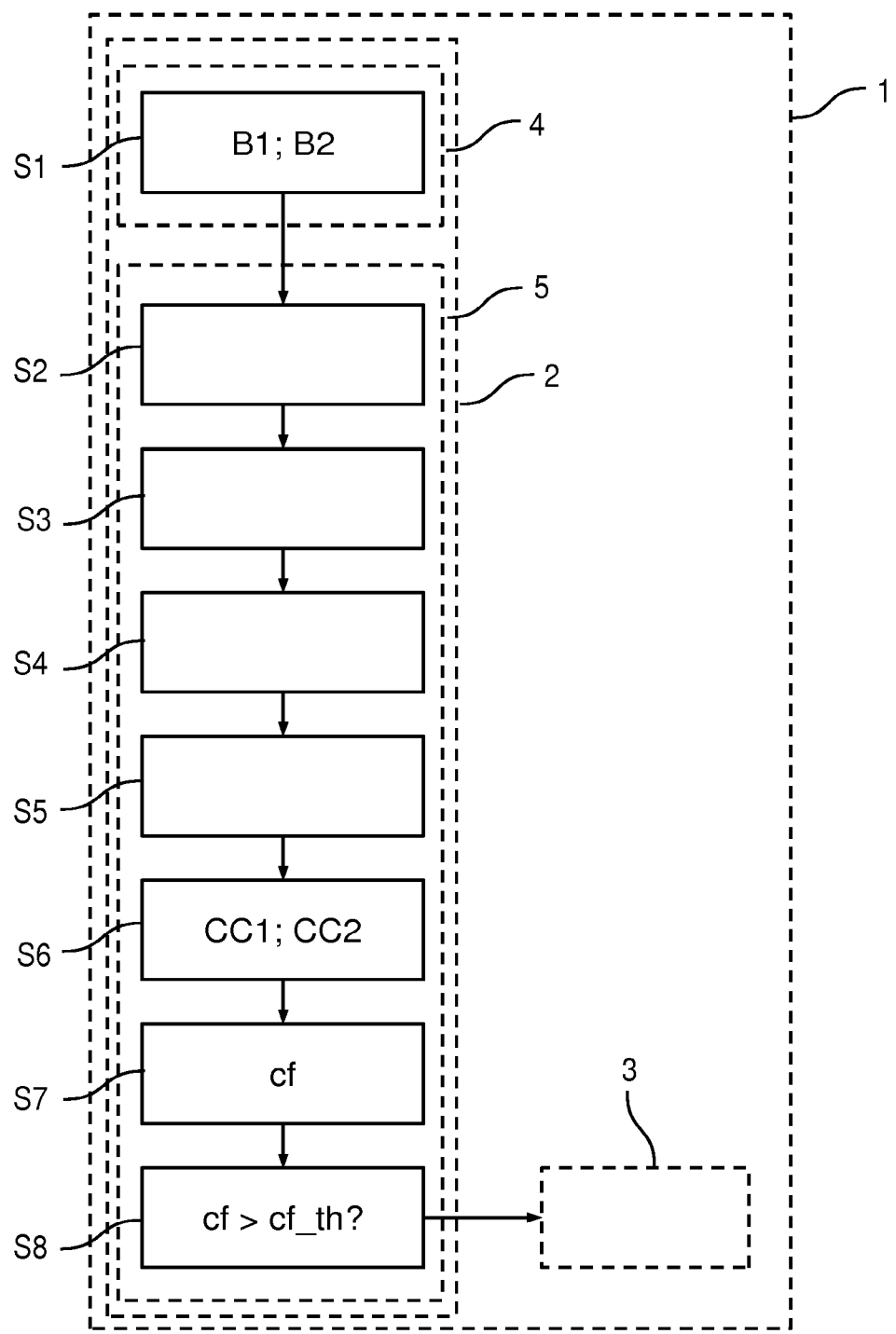
FIG. 1 shows a flowchart of the method with an associated apparatus.

FIG. 1 shows a lighting system 1 including a presence detector 2 and at least one light source 3 (e.g. including one or more LED-based illuminants, conventional fluorescent tubes, etc.) coupled to the presence detector 2. The presence detector 2 includes a CMOS sensor 4 and a data processing device 5 coupled therewith. Together, the CMOS sensor 4 and the data processing device 5 may also be referred to as a camera 4, 5.

The CMOS sensor 4 is e.g. arranged on a ceiling of a room to be monitored and records an original image B1 of the room, shown in FIG. 2, in a step S1. The original image B1 shows an object in the form of a person P and a background H, which has e.g. shelves, in a plan view. However, in principle, several persons P may also be situated in the original image B1.

During the recording thereof, the original image B1 has already been normalized in terms of the brightness thereof by the camera 4, 5 or the presence detector 2. To be precise, the camera 4, 5 is configured to automatically set recording parameters such as gain and/or exposure by way of a control loop such that the (brightness) histogram values of the original image B1 are kept at least approximately constant at the same level, largely independently of the brightness conditions actually present in the scene.

In a second step S2 the original image B1 is processed further by the data processing device 5 in order to remove the background H. To this end, an appropriate algorithm is applied to the original image B1.

In a third step S3, the person P is now captured as an object in the image which has been recorded and in which the background has been reduced. Should a plurality of persons P be present, they may be fed successively to an evaluation process in accordance with the following steps after being captured.

In a fourth step S4, the recorded image or the captured object may then be rotated toward a predetermined alignment, e.g. with a figure axis parallel to an image edge.

In a fifth step S5, an e.g. rectangular frame is placed around the captured object and the recorded image, which was processed further up until that point by means of steps S2 to S4, is tailored to the frame. In this way, a recorded image which is particularly suitable for cross correlation is provided.

In a step S6, the recorded image, which was processed further by means of steps S2 to S5, is, for the purposes of a comparison with a reference image (not depicted here), subjected to a non-normalized cross correlation in accordance with equation (1) in order to calculate a correlogram CC1 or $\{CC1_{ri,rj}\}$. By way of example, the reference image has a person shown in a plan view as a reference object.

FIG. 3 shows a matrix-like correlogram CC1 gathered from the original image B1 as a relief illustration in a side view. Here, a peak P1 of the result values of the matrix elements $CC1_{ri,rj}$ of the correlogram CC1 is comparatively high and narrow on account of a good correspondence between the person P and a reference object.

In a step S7, the characteristic similarity number cf in accordance with equation (2) is calculated for this correlogram CC1 according to $cf=(c\_mid^2/c\_rim^3) \cdot c\_size$. For the correlogram CC1, the characteristic similarity number cf1 is for example 55 in this case.

In a step S8, the characteristic similarity number cf1=55 is compared with a threshold cf_th, e.g. in accordance with cf1>cf_th. This is the case for cf_th=50, and so the person P here is classified as corresponding to the reference object representing a person, and thus identified. In the case of a positive recognition, it is possible e.g. to switch on the at least one light source 3.

FIG. 4 shows an original image B2 in a manner analogous to FIG. 2; in this original image, a substantive object G in the form of a chair was now recorded in addition to the image background H.

The correlogram CC2 belonging to the original image B2 is shown in FIG. 5. Here, a peak P2 is wider and significantly flatter than the peak P1, and so a characteristic similarity number cf2=32 emerges. This value is less than the threshold cf_th=50 for the reference object representing a person. Consequently, the object G is correctly identified as not being a person after a comparison cf2>cf_th.

Even though the present disclosure was illustrated more closely and described in detail by the shown embodiment, the present disclosure is not limited thereto and other variations may be derived therefrom by a person skilled in the art, without departing from the scope of protection of the present disclosure.

For example, the data processing device 5 may not constitute a part of the presence detector either, but instead be part of the lighting system 1. The lighting system 1 may also comprise a plurality of CMOS sensors.

Even though the present disclosure was illustrated more closely and described in detail by the shown exemplary embodiment, the present disclosure is not limited thereto and other variations may be derived therefrom by a person skilled in the art, without departing from the scope of protection of the present disclosure.

Thus, steps in FIG. 1 may also be carried out in a different sequence.

Generally, "a(n)", "one", etc. may be understood to mean a singular or a plural, in particular in the sense of "at least one" or "one or a plurality", etc., as long as this is not explicitly excluded, e.g. by the expression "exactly one", etc.

Moreover, a numerical indication may encompass exactly the indicated number and also a customary tolerance range, as long as this is not explicitly excluded.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

LIST OF REFERENCE SIGNS

1 Lighting system
2 Presence detector
3 Light source
4 CMOS sensor
5 Data processing apparatus
B1 Original image
B2 Original image
CC1 Correlogram
CC2 Correlogram
cf Characteristic similarity number
cf_th Threshold
G Substantive object
H Background
P Person
P1 Peak
P2 Peak
S1-S8 Method steps

The invention claimed is:

1. A method for image processing, comprising:
recording a recorded image containing at least one captured object;
using a non-normalized cross correlation to produce a crosscorrelation matrix between the recorded image and a reference image, which contains a reference object;
carrying out a comparison between a plurality of regions of the correlation matrix for the respectively captured object;
making a decision as to whether the respectively captured object and the reference object correspond on the basis of a result of the comparison, and
classifying the captured object based on the decision;
wherein the non-normalized cross correlation is carried out by means of the equation $$CC_{ri,rj} = \sum_{x=0}^{NTx} \sum_{y=0}^{NTy} T_{x,y} \cdot \text{Img}_{(x-ri),(y-rj)}$$

where $CC_{ri,rj}$ denotes a point or a matrix element of a cross correlation matrix or of a "correlogram" CC, $\text{Img}_{i,j}$ denotes a pixel of a recorded matrix-shaped image and $T_{x,y}$ denotes a pixel of a matrix-shaped reference image or reference template T with (NTx·NTy) pixels, which contains the reference object.

2. The method as claimed in claim 1, wherein a comparison between an inner region and an outer region of the cross correlation matrix is carried out while carrying out the comparison.

3. The method as claimed in claim 2, wherein the comparison is carried out on the basis of a ratio of count values from the inner region to count values from the outer region.

4. The method as claimed in claim 3, wherein, for the comparison, the ratio of the count values (c_mid, c_rim) is linked to a size (c_size) of the object to be identified or to be analyzed from the original image.

5. The method as claimed in claim 4, wherein a characteristic similarity number is calculated as a result of the comparisons in accordance with $cf=(c\_mid^{n1}/c\_rim^{n2})c\_size^{n3}$, with n1, n2, and n3 as rational scaling components, in particular in accordance with $cf=(c\_mid^2/c\_rim^3)c\_size$.

6. The method as claimed in claim 5, wherein the similarity number is compared to at least one threshold for making the decision.

7. The method of claim 6, wherein the classified captured object is in correspondence with the reference object depending on whether the characteristic similarity number reaches, exceeds or drops below the at least one threshold.

8. The method as claimed in claim 1, wherein the recorded image constitutes an image section which is tailored around the captured object.

9. The method as claimed in claim 1, wherein, earlier on, an original image recorded by a camera was normalized in terms of brightness in an image section which is tailored around the captured object.

10. The method as claimed in claim 9, wherein the normalization in terms of brightness is carried out by the camera itself.

11. The method as claimed in claim 10, wherein the normalization in terms of brightness is carried out on the basis of histogram values.

12. The method as claimed in claim 9, wherein the normalization in terms of brightness is carried out on the basis of histogram values.

13. The method as claimed in claim 1, wherein each of the captured objects is individually subjected to free-form selection and/or segmentation if a plurality of objects are present.

14. A presence detector comprising at least one image sensor, wherein the presence detector is configured for image processing, the method for image processing comprises:
recording an image containing at least one captured object;
using a non-normalized cross correlation to produce a cross correlation matrix between the recorded image and a reference image, which contains a reference object;
carrying out a comparison between a plurality of regions of the correlation matrix for a respectively captured object; and
making a decision as to whether the respectively captured object and the reference object correspond on the basis of a result of the comparison, and
classifying the captured object based on the decision;
wherein the non-normalized cross correlation is carried out by means of the equation $$CC_{ri,rj} = \sum_{x=0}^{NTx} \sum_{y=0}^{NTy} T_{x,y} \cdot \text{Img}_{(x-ri),(y-rj)},$$

where $CC_{ri,rj}$ denotes a point or a matrix element of the cross correlation matrix or of a "correlogram" CC, $\text{Img}_{i,j}$ denotes a pixel of a recorded matrix-shaped image and $T_{x,y}$ denotes a pixel of a matrix-shaped reference image or reference template T with (NTx·NTy) pixels, which contains the reference object.

15. The presence detector as claimed in claim 14, wherein the at least one image sensor is a CMOS sensor.

16. A lighting system comprising at least one presence detector, wherein the presence detector comprises at least one image sensor, wherein the presence detector is configured for image processing, the method for image processing comprising:
   recording an image containing at least one captured object;
   using a non-normalized cross correlation to produce a cross correlation matrix between the recorded image, and a reference image, which contains a reference object;
   carrying out a comparison between a plurality of regions of the correlation matrix for a respectively captured object; and
   making a decision as to whether the respectively captured object and the reference object correspond on the basis of a result of the comparison, and
   classifying the captured object based on the decision;
wherein the non-normalized cross correlation is carried out by means of the equation $$CC_{ri,rj} = \sum_{x=0}^{NTx} \sum_{y=0}^{NTy} T_{x,y} \cdot \text{Img}_{(x-ri),(y-rj)},$$

where $CC_{ri,rj}$ denotes a point or a matrix element of the cross correlation matrix or of a "correlogram" CC, $\text{Img}_{i,j}$ denotes a pixel of a recorded matrix-shaped image and $T_{x,y}$ denotes a pixel of a matrix-shaped reference image or reference template T with (NTx·NTy) pixels, which contains the reference object, and wherein the presence detector is coupled to at least one light source of the lighting system, wherein the lighting system is configured to trigger at least one action depending on the decision.

* * * * *